Oct. 10, 1961   J. C. HAUF III   3,004,216
NULL-INDICATING IMPEDANCE BRIDGE
Filed Nov. 22, 1957
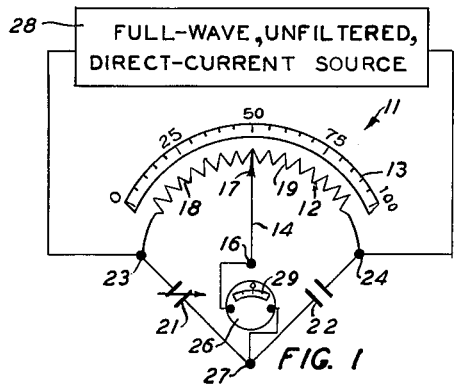
FIG. 1
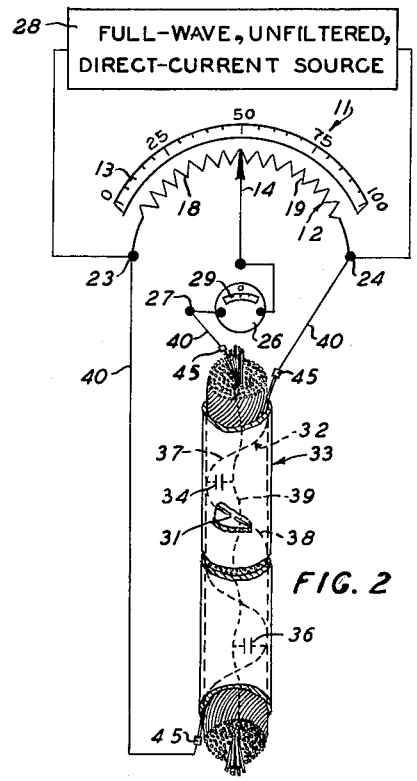
FIG. 2
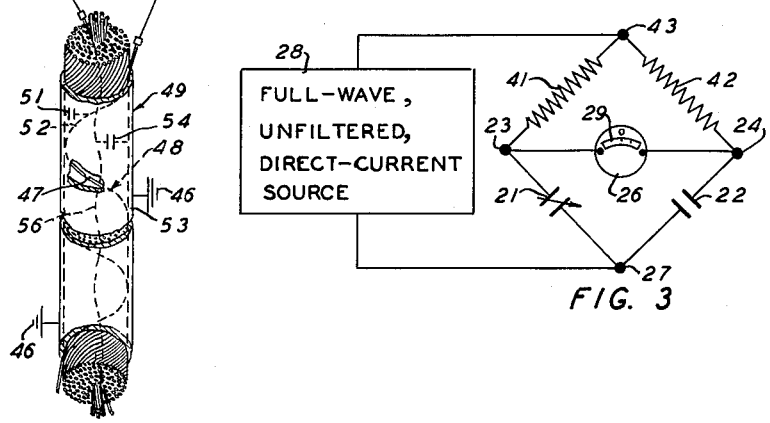
FIG. 3
FIG. 4
INVENTOR.
J. C. HAUF, III
BY
A. C. Schwarz, Jr.
ATTORNEY

3,004,216
NULL-INDICATING IMPEDANCE BRIDGE
Joseph C. Hauf III, Towson, Md., assignor to Western Electric Company, Incorporated, New York, N.Y., a corporation of New York
Filed Nov. 22, 1957, Ser. No. 698,092
6 Claims. (Cl. 324—52)

This invention relates to resistive, capacitive and/or inductive measuring and testing techniques and devices, and more particularly, although not exclusively, to testing techniques and devices which may be used for analyzing and locating discontinuities in transmission lines or cables, such as underground, submarine or aerial cables, by determining the distances the discontinuity of an individual conductor is located from the ends of the transmission line or cable.

In the manufacture of communications cables, faults or imperfections in the electrical characteristics thereof may result. Such faults, which may be various types, may consist of an open-circuit fault or "open," which is caused by a break or discontinuity in a conductor. The faults may occur at different points along the length of the cable and may result from imperfect manufacturing processes or may be introduced as a result of abuse of the factory-approved cable during the shipping and handling of the cable before, during and/or after installation thereof in the field.

In the manufacture and maintenance of transmission lines or cables, repairs must be made. However, before such repairs can be made, the faults must be located, which may be rather difficult in some instances because of the particular environment in which the defective portions of the cable are located. It is therefore obvious that accurate localization of such faults is of the utmost importance.

Various forms of bridge-type testing devices have been used in the past and are being used presently for locating the distance from the end of a cable to a fault in a conductor in the cable, such as a Wheatstone bridge, wherein a comparison is made of the reactive, inductive and/or resistive properties of the specimen under test. The apparatus which is used to locate the site of the defect in the cable, which may be hundreds or even thousands of feet long, must be very accurate and preferably inexpensive, simple in construction and simple to operate.

In ordinary capacitance bridges, consisting of four element network arrangements, there are two resistors of equal value called ratio arms. In series with one of the resistors is a variable capacitance arm called the standard arm. In series with the other resistor is an unknown capacitance to be measured. A source of alternating-current potential is impressed across the bridge at points between the resistors and the capacitors. An alternating-current signal is produced by the potential and is divided so that it flows through the two sides of the bridge connected in parallel across the source of alternating-current potential.

If the two capacitances are of equal value, the potential of the points between each resistor and its associated capacitance will be equal. However, if the values of the capacitances are unequal, a potential difference will exist between the two points which can be detected by a suitable detector, such as a headset, an alternating-current voltmeter, a tuning eye, or other suitable means.

These types of detectors are capable of indicating the presence and magnitude of any potential difference which exists between the two points, but are not capable of determining if the value of the unknown capacitance is greater or less than the standard capacitance. This determination is important where mass production testing is made in manufacturing operations so that the operator will know initially and immediately which direction to adjust the standard arm in order to balance the bridge and determine the value of the unknown capacitance, to determine the location of a fault in a conductor of a multiconductor cable if the bridge is being used for that purpose.

Some bridges have been developed with electronic, alternating-current, phase-sensitive detectors which can be used to overcome the inability of the above-described type of detector to indicate the direction the standard arm in the bridge should be adjusted. However, these detectors are quite complicated and relatively expensive.

It is therefore one of the principle objects of the present invention to overcome these difficulties by producing techniques and impedance bridges for electrical measuring and testing which will eliminate the need of an alternating-current, phase-sensitive detector and yet indicate the direction in which the unknown property varies from the known property as well as the amount of such variation.

The above object can be accomplished by utilizing a similar type of bridge circuit to that described above in regard to conventional capacitance bridges by substituting an unfiltered, full-wave, direct-current signal input for the conventional alternating-current signal input.

The detector in such a bridge may be a commercially available zero-center type, direct-current detector. In this way, if the values of the impedances under test are not equal, a potential differences will exist and a current will flow through the detector in the form of a pulsating, direct-current signal, and thus the detector will give an indication by a deflection, on a meter thereof, in one direction if the unknown value is greater or in the other direction if the unknown value is smaller than the value of the standard impedance.

Another object of the present invention is to provide improved techniques and apparatus particularly adapted for the accurate location of defects in transmission lines or cable systems.

More particularly, another object of the present invention is to provide improved techniques and bridge apparatus by means of which the distance the fault is located from the end of the cable may be determined by reading directly from a scale of the apparatus the magnitude and direction of unbalance of the bridge.

Other objects and features of the invention will be understood more readily from the following detailed description of a specific embodiment thereof, when read in conjunction with the accompanying drawings in which:

FIG. 1 is a schematic illustration of a bridge circuit embodying certain principles of the invention, which may be used to measure an unknown impedance;

FIG. 2 is a schematic illustration of a modification of the bridge circuit of FIG. 1 utilized for locating a fault in a conductor of a transmission cable;

FIG. 3 is a schematic illustration of another modification of the bridge circuit of FIG. 1, and FIG. 4 is a schematic illustration of a modification of the bridge circuit of FIG. 2.

Referring now to the drawings, wherein like numerals designate the same or similar elements throughout the various views, and more particularly to FIG. 1, there is shown an embodiment of the invention which is illustrated as being in the form of bridge apparatus for measuring or testing reactive elements, such as inductive and/or capacitive elements, where it is desirable to measure two such elements to determine the variation between the values thereof.

A potentiometer, designated generally by the numeral 11, includes a resistance, designated generally by the numeral 12, extending along a scale 13 calibrated from zero to one hundred percent with the zero end of the scale positioned adjacent to the left end of the resistance 12, as viewed in FIG. 1. The potentiometer 11 also includes an adjustable sliding contact 14 which is mounted pivotally at the point 16 with one end 17 thereof in sliding engagement with the resistance 12. The end 17 of the contact 14 divides electrically the resistance 12 of the potentiometer 11 into two different ratio arms 18 and 19. The ratio arms are variable, the reasons for which will become obvious later, but for the specific application as herein described, the ratio arms 18 and 19 will remain equal in value.

A pair of capacitances 21 and 22 are connected in series with each other, with one end of each capacitance 21 and 22 connected to a binding post 23 or 24, on respective ends of the potentiometer 11. The value of the capacitance 21 is known and variable, and the value of the other capacitance 22 is unknown and must be measured by comparing the ratio of the number of units of resistance in each of the ratio arms 18 and 19 when the bridge is balanced.

A direct-current, null-indicating detector 26 is connected to an intermediate point of the potentiometer 11 through the sliding contact 14 with the other end connected to a binding post 27 at a juncture between the two capacitances 21 and 22.

The direct-current, null-indicating detector 26 is one which is commercially available and preferably one which possesses a high input impedance to prevent overloading of the bridge circuit and a high degree of sensitivity because of the low level signal which exists in the bridge when the bridge is unbalanced. The detector 26 should be of a zero-center type so that it will indicate either plus or minus with a polarity shift at the zero reading.

A source of full-wave, unfiltered, direct-current potential is connected across binding posts 23 and 24 at the zero and one hundred percent ends of the potentiometer 11, respectively. The source of full-wave, unfiltered, direct-current potential can be obtained by various means, such as by use of a bridge rectifier (not shown) across a 60-cycle alternating-current source (not shown). When the source 28 of unfiltered, full-wave, direct-current potential, connected to the binding posts 23 and 24 on each end of the potentiometer 11, is impressed across the bridge, a pulsating direct-current signal, produced thereby, is divided so that it flows through the two sides of the bridge connected in parallel across the source 28 of unfiltered, full-wave, direct-current potential.

If the two capacitances 21 and 22 are of equal value and the sliding contact 14 is in the electrical center of the potentiometer 11, the potential at the binding post 27 between each of the capacitances 21 and 22 and at the sliding contact 14 will be equal. However, if the values of the capacitances 21 and 22 are unequal, with the sliding contact 14 in a central position, a potential difference will exist between the post 27 and the end 17 of the contact 14 which will be detected by the null-indicating detector 26.

The detector 26 will sense a pulsating, direct current and indicate an average value as a deflection on a meter 29 thereof. The deflection on the meter 29 will be in one direction if the unknown value of the unknown capacitance 22 is greater than the known value of the capacitance 21 and in the other direction if the value of the unknown capacitance 22 is less than the known value of the capacitance 21. In this way the capacitance 21 can be varied in the proper direction to balance the bridge and cause the detector 26 to indicate null. At this time the variable capacitance 21 will be the same capacitance as the unknown capacitance 22 so the operator can read directly what the unknown value is.

With the above-described novel apparatus embodying some of the principles of the present invention, an indication is given on either side of the null point of the detector 26 when the bridge is unbalanced, since the alternating components of the source 28 of unfiltered, full-wave, direct-current potential is used to produce an electrostatic charge in each of the capacitances 21 and 22 which causes the output of the bridge to indicate either plus or minus reading on the meter 29 of the detector 26 causing the indicator thereof to shift either to the right or left, respectively, as viewed in FIG. 1.

The above-described apparatus, as illustrated in FIG. 1, is susceptible of various uses and may be used, as described previously, for such purposes as comparing two resistances, capacitances or inductances, or a combination of any two or more of the three forms of impedances, or measuring two unknown resistances, capacitances or inductances, or a combination of any two or more of the three forms of impedances. The apparatus can also be utilized as is illustrated in FIG. 2, where it is desirable to determine the location of an open or break 31, the existence of which has been determined previously, in an ungrounded conductor, designated generally by the numeral 32, of a cable, designated generally by the numeral 33, the length of which is known. The location of the open or break 31 in the cable 33 can be determined by determining the differences in electrostatic capacitances 34 and 36 between the two portions 37 and 38, respectively, of the open conductor 32 and an ungrounded nondefective conductor 39 of the same cable 33, if it is assumed that the capacitances 34 and 36 thereof are proportional to the lengths of the portions 37 and 38 of the open conductor 32 (in dotted lines) on either side of the break 31. The electrostatic capacitances 34 and 36, which are illustrated in FIG. 2, are not separate electrical elements, but only represent the capacitance formed by the charges on the portions 37 and 38 of the open conductor 32 and on the nondefective conductor 39.

When it is desirable to determine the location of such an open or break 31 in the conductor 32 of the cable 33, the capacitances 21 and 22 can be replaced by the respective electrostatic capacitances 36 and 34, respectively, to a metallic cable sheath or any convenient unbroken conductor 39 of the cable 33 adjacent to the faulty conductor 32 and substantially parallel thereto as illustrated in FIG. 2. The ends of the conductor 32 are connected detachably to the binding posts 23 and 24 and an end of the conductor 39 is connected to the binding post 27 all by appropriate means such as shielded test leads 40 and clamps 45.

The bridge is then balanced by adjusting the contact 14 in a direction indicated by the meter 29 of the null-indicating detector 26. The bridge will be balanced when the voltage drop from the source 28 of full-wave, unfiltered, direct-current potential across the electrostatic capacitance 36 formed by the portion 38 of the broken conductor 32 and the unbroken conductor 39 is equal to the voltage drop across the portion 18 of the resistance 12 of the potentiometer 11 extending from the contact 14 to the end thereof which is connected to the binding post 23 and thus that portion 38 of the broken conductor 32.

In this manner, when the potentiometer 11 is adjusted so that the detector 26 indicates zero, the proportional distances that the fault or break 31 is located from each end of the cable 33 will be indicated by the relative position of the contact 14 with respect to the ends of the scale 13 and thus the ends of the resistance 12.

The scale 13 may also be calibrated and divided into units corresponding to the number of units of length of the conductor 32. The number of units of resistance or percentage of length of the resistance 12 in each ratio arm 18 and 19 will indicate directly the distance in units of length or the percentage of the total length of the cable 33 the break is located from the respective ends of the cable 33.

It should be noted that with the null-indicating detector 26 having the desired degree of sensitivity and with the contact 14 positioned in the center of the scale 13, the distance that the break or discontinuity 31 in the conductor 32 is located from the end of the cable 33 could be determined by a direct reading of the meter 29 of the null-indicating detector 26. The meter 29 may be calibrated from zero to one hundred percent corresponding to the units of length of the broken conductor 32 with fifty percent at the null center.

It should also be noted that the circuit illustrated in FIGS. 1 and 2 may be modified as illustrated in FIG. 3 so that the opposing portions 18 and 19 of the potentiometer 11 are replaced by standard variable resistances 41 and 42, respectively, which form ratio arms in the modified bridge.

An interchange of the places in which the null-indicator detector 26 and source 18 of full-wave, unfiltered, direct-current potential are connected to the bridges of FIGS. 1 and 2 may be made to improve the sensitivity of the bridge. In this manner, if the resistances, capacitances, and/or reactances under test are equal in value, the detector 26 will have a null indication. Otherwise, the detector 26 will indicate directly the proportional difference and direction of the variation in impedance. The capacitance 21 also can be adjusted to balance the bridge.

FIG. 3 illustrates a capacitance bridge consisting of a four element network arrangement, in which two resistors 41 and 42 of equal value called ratio arms are each connected in series with the pair of capacitances 21 and 22. The capacitance 21 is a variable capacitance and is termed the standard arm. The other capacitance 22 is of an unknown value to be measured. The source 28 of unfiltered, full-wave, direct-current potential is connected across the bridge to the binding post 27 and a binding post 43 between the resistors 41 and 42 and, the zero-center type, null-balance, direct-current detector 26 is connected to binding posts 23 and 24 between the resistor 41 and the capacitance 21 and between the resistor 42 and the capacitance 22, respectively.

A current flow from the source 28 of unfiltered, full-wave, direct-current potential is divided so that it flows through the two sides of the bridge connected in parallel across the source 28. If the two capacitors 21 and 22 are of equal value, the potential at the binding posts 23 and 24 between each resistor 41 and 42 and its associated capacitance 21 and 22, respectively, will be equal. However, if the values of the capacitors 21 and 22 are unequal, a potential difference will exist between the two binding posts 23 and 24 which will be detected by the detector 26.

The detector 26 will be utilized to detect and indicate the presence and magnitude of the potential difference which exists between the two binding posts 23 and 24 and thus indicate the existence and some average value of the amount of the difference in the value of the capacitances 21 and 22 and the direction in which the values vary by a deflection in one direction or the other from the zero-center point on the meter 29 of the detector 26. In this manner the operator will know immediately which direction to adjust the standard arm in order to balance the bridge and determine more accurately the value of the unknown capacitance 22.

Referring now to FIG. 4, there is shown an alternative embodiment of the present invention which may be utilized for locating a discontinuity 47 in an ungrounded conductor, designated generally by the numeral 48, the presence of which has been determined previously but the location of which along a cable, designated generally by the numeral 49, has not been ascertained. The detector 26 in the alternate embodiment of the invention, as illustrated in FIG. 4, is connected to ground 46. The location of the fault or break 47 in the conductor 48 of the cable 49 of a known length can be determined by comparing the difference in the electrostatic capacitance 51 between one portion 52 of the open conductor 48 and the grounded sheath 53 of the cable 49 and the electrostatic capacitance 54 between an ungrounded, nondefective conductor 56 to the grounded sheath 53. The capacitances 51 and 54, which are illustrated in dotted lines in FIG. 4, are not separate electrical elements, but only represent the capacitance formed by the charge on the portion 52 of the conductor 48 and ground 46, and on the conductor 56 and ground 46, respectively.

This technique and apparatus may be utilized when one end of the cable 49 under test is inaccessible for test purposes or is a relatively long distance away from the test location, such as in the case of an installed cable.

The embodiments of the invention which are herein disclosed as being in the form of techniques and apparatus for locating faults in multiconductor cables or wires in a transmission system are also applicable for use in the measuring or testing of resistive and/or reactive elements, such as resistive, inductive or capacitive elements or a combination of any two or more thereof where it is desirable to measure two such elements to determine the variation between the values of each, and vice versa.

It should be noted that in each instance the embodiments of the invention which are illustrated and described as being capacitive could all be replaced by resistive and/or inductive elements or a combination of any two or more of the three to obtain the same result. The illustrated resistive elements in the ratio arms of the bridge also could be replaced with other electrical elements of the appropriate impedance.

It is to be understood that the above-described arrangements are simply illustrative of the application of the principles of the invention. Other arrangements may be devised by those skilled in the art which will embody the principles of the invention and fall within the spirit and scope thereof.

What is claimed is:

1. Electrical measuring and comparing apparatus, which comprises a bridge including two electrical elements of known values of impedance forming two ratio arms, an unknown capacitance under test forming a third arm and a capacitance of a known value forming a fourth arm, means for impressing an unfiltered, full-wave, direct-current potential across the bridge, and a null-indicating, direct-current detector connected to the bridge which indicates directly the existence and direction in which the value of the unknown capacitance varies form the value of the known capacitance.

2. Electrical measuring and comparing apparatus, which comprises a bridge including two electrical elements of known values of impedance forming two ratio arms, an unknown inductance under test forming a third arm and an inductance of a known value forming a fourth arm, means for impressing an unfiltered, full-wave, direct-current potential across the bridge, and a null-indicating, direct-current detector connected to the bridge which indicates directly the existence and direction in which the value of the unknown inductance varies from the value of the known inductance.

3. Electrical measuring and comparing apparatus, which comprises a bridge including two electrical elements of known values of impedance forming two ratio arms, an unknown reactance under test forming a third arm and a reactance of a known value forming a fourth arm, means for impressing an unfiltered, full-wave, direct-current potential across the bridge, and a null-indicating, direct-current detector connected to the bridge which indicates directly the existence and direction in which the value of the unknown reactance varies from the value of the known reactance.

4. Apparatus for locating a discontinuity in a defective conductor of a multiconductor transmission system having a nondefective conductor substantially parallel and adjacent to the defective conductor and having one end thereof connected to one end of the defective conductor, which comprises a pair of resistive ratio arms connected across the ends of the defective conductor and to the end of the adjacent nondefective conductor of the transmission system which is connected to one end of the defective conductor to form a bridge, means for impressing an unfiltered, full-wave, direct-current potential across the bridge, and a null-indicating, direct-current detector connected to the bridge which indicates directly the existence of a difference in the electrostatic capactitances between the two portions of the defective conductor on opposing sides of the discontinuity and the adjacent nondefective conductor and the direction in which the capacitances vary and thus the distance that the discontinuity is located from the ends of the transmission system.

5. A four arm bridge circuit which may be utilized in a fault locator for determining the location of a break in a faulty conductor of a multiconductor transmission system, including a nondefective conductor substantially parallel and adjacent to the faulty conductor, which comprises a potentiometer resistance, a potentiometer sliding contact dividing the resistance into two ratio arms, the opposite ends of the faulty conductor being connected to opposite ends of the potentiometer resistance so that the electrostatic capacitances between the portions of the faulty conductor on either side of the break and the nondefective conductor form the other two arms of the bridge, a null-indicating, direct-current detector which indicates the existence and direction of unbalance of the bridge connected to the bridge at the opposite ends of the potentiometer resistance, a source of unfiltered, full-wave, direct-current potential connected to the bridge at a point on the potentiometer resistance through the sliding contact and at one end of the nondefective conductor, and a calibrated scale means divided into a number of units corresponding to the number of units of the length of the faulty conductor, whereby when a balance is indicated by the null-indicating detector the number of units of length in the ratio arms of the bridge indicate directly the distances the break is located in units of length from the ends of the faulty conductor.

6. A four arm bridge circuit which may be utilized in a fault locator for determining the location of a break in a faulty conductor of a multiconductor transmission system, including a nondefective conductor substantially parallel and adjacent to the faulty conductor, which comprises a potentiometer resistance, a potentiometer sliding contact dividing the resistance into two ratio arms, the opposite ends of the faulty conductor being connected to opposite ends of the potentiometer resistance so that the electrostatic capacitances between the portions of the faulty conductor on either side of the break and the nondefective conductor form the other two arms of the bridge, a source of unfiltered, full-wave, direct-current potential connected to the bridge at the opposite ends of the potentiometer resistance, a null-indicating, direct-current detector which indicates the existence and direction of unbalance of the bridge connected to the bridge at a point on the potentiometer resistance through the sliding contact and at one end of the nondefective conductor, and a calibrated scale means divided into a number of units corresponding to the number of units of the length of the faulty conductor, whereby when a balance is indicated by the null-indicating detector, the number of units of length in the ratio arms of the bridge indicate directly the distances the break is located in units of length from the ends of the faulty conductor.

References Cited in the file of this patent

UNITED STATES PATENTS

| | | |
|---|---|---|
| 1,958,361 | Estes et al. | May 8, 1934 |
| 2,135,587 | Lovelady | Nov. 8, 1938 |
| 2,176,759 | Borden | Oct. 17, 1939 |
| 2,270,732 | Jones | Jan. 20, 1942 |
| 2,569,098 | Hendricks et al. | Sept. 25, 1951 |
| 2,595,626 | Bailey | May 6, 1952 |

FOREIGN PATENTS

| | | |
|---|---|---|
| 852,267 | Germany | Aug. 14, 1952 |
| 756,568 | Germany | July 23, 1953 |

OTHER REFERENCES

Wilhelm: "Impedance Bridge With a Billion-To-One Range," Bell Laboratories Record, March 1945, pages 89–92.

Gilling: "Workshop R–C Bridge," Wireless World, February 1955, pages 80–82.